2,918,480

9-BETA-HYDROGEN-11-KETO-CHOLESTENES AND ANDROSTENES

Albert Wettstein and Karl Heusler, Basel, Switzerland, assignors to Ciba Pharmaceutical Products, Inc., Summit, N.J.

No Drawing. Application August 3, 1953
Serial No. 372,184

Claims priority, application Switzerland August 8, 1952

2 Claims. (Cl. 260—397.2)

This invention relates to new compounds, more particularly, $\Delta^{7:8}$-11-keto-9$\beta$-steroids and a process for the manufacture thereof. The invention also embraces the conversion of the aforesaid $\Delta^{7:8}$-11-keto-9$\beta$-steroids to $\Delta^{8:9}$-11-keto-steroids.

The new $\Delta^{7:8}$-11-keto-9$\beta$-steroids are prepared by reacting $\Delta^{7:8}$-9:11-oxido-steroids with an electrophilic agent in the presence of an ether. On reacting the resulting $\Delta^{7:8}$-11-keto-9$\beta$-steroids with an acid agent, the $\Delta^{8:9}$-11-keto-steroids are obtained.

The $\Delta^{7:8}$-11-keto-9$\beta$-steroids obtained belong to the 14-normal series, that is to say, to the class of steroids with trans-configuration of the rings C and D as it is present in natural hormones, and yield $\Delta^{8:9}$-11-keto-14-normal-steroids. This is very surprising in view of the extraordinary ease with which $\Delta^{8:9}$-11-keto-14-normal-steroids rearrange into $\Delta^{8:9}$-11-keto-14-epi-steroids.

It is already known that $\Delta^{7:8}$-9:11-oxido-steroids in benzene solution under the influence of boron trifluoride or ferric chloride can be converted into $\Delta^{8:9}$-11-ketones. Using this method it is often difficult to isolate in a pure form the end products from the resulting mixture. The conversion according to the present invention into $\beta,\gamma$-unsaturated ketones which have the unnatural 9$\beta$ configuration at carbon atom 9 is accordingly very surprising and moreover, in contradistinction to the known conversion into $\alpha,\beta$ unsaturated 11-ketones, it takes place entirely uniformly and in practically quantitative yield.

The conversion of the $\Delta^{7:8}$-9:11-oxido-steroids into $\Delta^{7:8}$-11-keto-9$\beta$-steroids may be carried out in the presence of any open-chain or cyclic ethers, as for example diethyl ether, tetrahydrofurane or dioxane. As electrophilic agents there are suitable any substances which are capable of accepting an electron pair, primarily boron trifluoride but also anhydrous ferric chloride or zinc chloride.

The resulting $\beta,\gamma$-unsaturated ketones can be converted into $\Delta^{8:9}$-11-ketones by means of acids, such as mineral acids, organic sulfonic acids or carboxylic acids, as e.g. acetic acid, with or without the addition of salts or metals, such as zinc, in an aqueous or anhydrous medium, as for example in alcohols, ethers or halogenated hydrocarbons, or with acid salts in the presence of a suitable diluent, such as boron trifluoride or ferric chloride in benzene. Particularly suitable are acids which have little inclination to combine additively with double bonds, such as sulfuric acid or anhydrous p-toluene sulfonic acid, preferably in an oxygenic solvent, such as ether or dioxane.

The $\Delta^{7:8}$-9:11-oxido-steroids used as starting materials belong to the cyclopentanopolyhydro-phenanthrene or polyhydrochrysene series. Particular importance is attached to the derivatives of ergostane, cholestane, coprostane, sitostane, stigmastane, spirostane, allospirostane, cholane, allocholane, pregnane, allopregnane, androstane and testane. In addition the starting materials may be substituted in the nucleus or in the side chain, for example in 3, 5, 6, 17, 20 and/or 21-position by free or functionally converted hydroxyl or oxo groups, such as acyloxy groups, for example, acetoxy, propionyloxy, benzoyloxy, or tosyloxy groups, by alkoxy, e.g., methoxy or ethoxy groups, by acetalized oxo groups, moreover by free or functionally converted carboxyl groups, such as nitrile or esterified carboxyl groups or by a lactone, e.g., butenolide group. The starting materials may possess any configuration and may also contain double bonds, as for example in 5:6- or 22:23-position.

According to the starting materials used, the new ketones are therapeutically applicable or constitute important intermediate products in the manufacture of active steroids with oxygen in 11-position, for example, cortisone, $\Delta^4$-3:11:20-triketo-17$\alpha$:21 - dihydroxypregnane. Thus the $\Delta^{8:9}$-11-keto-steroids obtained from the $\Delta^{7:8}$-9:11-oxido-steroids can be reduced to 8,9-saturated 11-oxygenated steroids which by methods already known can be converted to cortisone.

The following examples illustrate the invention, the relation between part by weight and part by volume being the same as that between the gram and the cubic centimeter:

Example 1

2.0 parts by weight of $\Delta^{7:8:22:23}$-3$\beta$-acetoxy-9:11$\alpha$-oxido-ergostadiene of M.P. 200–201° C. are dissolved in 80 parts by volume of absolute dioxane and treated with 0.4 part by volume of freshly distilled boron trifluoride-ether complex. The solution is kept for 24 hours at room temperature and then poured with stirring into a mixture of 40 parts by volume of saturated sodium bicarbonate solution and 120 parts by volume of water. The pale yellowish, pulverulent precipitate produced is filtered with suction, washed with water and while still in the moist condition dissolved in a mixture of 50 parts by volume of acetone and 30 parts by volume of ether. The clear solution obtained is concentrated to the commencement of crystallization and maintained for some time at −10° C. The crystallizate obtained is filtered with suction, washed with cold acetone and the mother liquor again concentrated. A total quantity of 1.90 parts by weight of $\Delta^{7:8:22:23}$-3$\beta$-acetoxy-11-keto-9$\beta$-ergostadiene of M.P. 145–147° C. are obtained. The compound exhibits the specific rotation $[\alpha-]_D=-144°$ (in chloroform) and in the ultraviolet spectrum, at about 295 m$\mu$, a typical maximum for the isolated keto group (log $\epsilon=2.07$).

Example 2

1 part by weight of $\Delta^{7:8:22:23}$-3$\beta$-acetoxy-9:11$\alpha$-oxido-ergostadiene is suspended in 50 parts by volume of diethyl ether and 0.2 part by volume of distilled boron trifluoride-ether complex added. The reaction solution is maintained for 24 hours at room temperature and in the first few hours occasionally shaken. After about 3 hours the substance is completely dissolved. After the expiry of the reaction time, the colorless solution is diluted with ether, washed with sodium bicarbonate solution and water, dried and evaporated. 1.0 part by weight is obtained of a crystalline colorless residue of M.P. 140–144° C. which consists of practically pure $\Delta^{7:8:22:23}$-3$\beta$-acetoxy-11-keto-9$\beta$-ergostadiene.

The same compound is obtained when instead of 0.2 part by volume of boron trifluoride-ether-complex 0.1 part by weight of freshly sublimed anhydrous ferric chloride are added to the suspension of the starting material in diethyl ether.

Example 3

1.87 parts by weight of $\Delta^{7:8:22:23}$-3$\beta$-acetoxy-9:11$\alpha$-oxido-ergostadiene of melting point 203–206° C. are suspended in 75 parts by volume of ether which has been freshly distilled over sodium. 0.3 part by volume of distilled boron trifluoride-ether-complex is admixed and the whole maintained at room temperature for 4 hours in a well closed vessel. By occasional shaking in the course of the first hour and a half the substance is caused to pass into solution. After the expiry of the reaction time the clear, yellowish solution is diluted with ether, washed with sodium bicarbonate solution and water, dried and evaporated. There are obtained 1.86 parts by weight of $\Delta^{7:8:22:23}$-3$\beta$-acetoxy-11-keto-9$\beta$-ergostadiene in the form of a white crystalline residue of melting point 144–146° C.

For conversion into the $\alpha,\beta$-unsaturated ketone the resulting crude product is dissolved in 100 parts by volume of absolute ether and mixed with a solution of 1.0 part by volume of concentrated sulfuric acid in 25 parts by volume of absolute ether. The reaction mixture is kept at room temperature for 6 hours in the dark. The pale yellow solution is then diluted with ether, washed with sodium bicarbonate solution and water, dried and evaporated. There is obtained a solid, slightly yellow-colored crude products which in the ultraviolet spectrum shows a maximum at 253 m$\mu$ (log $\epsilon$=3.88), corresponding to an 85% content of $\alpha,\beta$-unsaturated ketone. By recrystallization from ethanol there is obtained the pure $\Delta^{8:9:22:23}$-3$\beta$-acetoxy-11-keto-ergostadiene of melting point 131–131.5° C.; [$\alpha$]$_D$=+112° (in chloroform), which in the ultraviolet spectrum has a strong absorption maximum at 253 m$\mu$ (log $\epsilon$=3.95).

*Example 4*

1.35 parts by weight of the crude $\Delta^{7:8:22:23}$-3$\beta$-acetoxy-11-keto-9$\beta$-ergostadiene prepared as prescribed in Example 2 are dissolved in 100 parts by volume of freshly distilled absolute dioxane and mixed with a solution of 1.0 part by volume of concentrated sulfuric acid in 10 parts by volume of absolute dioxane. The solution is maintained at room temperature for 4 hours, then poured into a solution of 4.0 parts by weight of sodium bicarbonate in 200 parts by volume of water and kept at 0° C. for 2 hours. The resulting white granular precipitate is suction-filtered, washed well with water, taken up in benzene and dried, and the benzene solution evaporated in vacuo. There are obtained 1.35 parts by weight of a solid yellowish residue which, on the basis of the ultraviolet spectrum, contains about 80% of $\Delta^{8:9:22:23}$-3$\beta$-acetoxy-11-keto-ergostadiene (log $\epsilon$=3.86 at 253 m$\mu$). The crude product is dissolved in 27 parts by volume of hot ethanol and allowed to stand for 14 hours at room temperature. Traces of a difficultly soluble by-product are then filtered off and the filtrate further concentrated. There is obtained therefrom the pure $\Delta^{8:9:22:23}$-3$\beta$-acetoxy-11-keto-ergostadiene in well formed needles of melting point 131–131.5° C.; [$\alpha$]$_D$=+112° (in chloroform).

Instead of sulfuric acid used in the above example the rearrangement can be effected by an equal amount of anhydrous p-toluene sulfonic acid dissolved in absolute dioxane.

*Example 5*

0.5 part of $\Delta^{7:8}$-3$\beta$:17$\beta$-diacetoxy-9:11$\alpha$-oxido-androstene of melting point 146–150° C. are dissolved in 20 parts by volume of absolute ether, mixed with 0.1 part by volume of boron trifluoride-ether-complex and allowed to stand at room temperature for 24 hours. The reaction mixture is then diluted with ether, washed with sodium bicarbonate solution and water, dried and evaporated. There is obtained 0.5 part by weight of a crystalline residue melting at 129–140° C. After recrystallization from aqueous acetone and ether, the pure $\Delta^{7:8}$-3$\beta$:17$\beta$-diacetoxy-11-keto-9$\beta$-androstene melts at 146–149° C. On prolonged heating conversion into a higher melting substance occurs already during melting. The pure substance of melting point 146–149° C. shows at 295 m$\mu$ (log $\epsilon$=1.98), an absorption maximum which is typical for the isolated keto group, and it exhibits the specific rotation [$\alpha$]$_D$=–175° (in chloroform). With pure $\Delta^{7:8}$-3$\beta$:17$\beta$-diacetoxy-9:11$\alpha$-oxido-androstene of melting point 152–153.5° C. it gives a markedly depressed mixed melting point.

For conversion, 0.25 part by weight of the crude $\Delta^{7:8}$-3$\beta$:17$\beta$-diacetoxy-11-keto-9$\beta$-androstene is dissolved in 10 parts by volume of absolute ether and the solution mixed at room temperature with 2 parts by volume of a solution of 1.0 part by volume of concentrated sulfuric acid in 25 parts by volume of ether. After 5 hours the whole is diluted with ether and washed with sodium bicarbonate solution and water and the ether solution dried and evaporated. 0.25 part by weight is obtained of a white, crystalline residue. By recrystallization from methanol there is obtained therefrom the pure $\Delta^{8:9}$-3$\beta$:17$\beta$-diacetoxy-11-keto-androstene of melting point 177.5–179° C., which exhibits at 252 m$\mu$ a strong absorption maximum (log $\epsilon$=3.96); [$\alpha$]$_D$=+93° (in chloroform).

*Example 6*

0.5 part by weight of $\Delta^{7:8}$-3$\beta$-acetoxy-9:11$\alpha$-oxido-cholestene of melting point 131–133° C. is dissolved in 20 parts by volume of ether which have been freshly distilled over sodium, and mixed at room temperature with 0.08 part by volume of distilled boron trifluoride-ether-complex. After 4 hours the mixture is worked up as in Example 5. After evaporation of the ethereal solution there remains behind 0.51 part by weight of crude, crystalline $\Delta^{7:8}$-3$\beta$-acetoxy-11-keto-9$\beta$-cholestene. By recrystallization from acetone and a mixture of ether and methanol there is obtained the pure substance which crystallizes in the form of fine needles of melting point 111–113° C.; [$\alpha$]$_D$=–133° (in chloroform), and having, at 295 m$\mu$ an absorption maximum which is typical for isolated ketones (log $\epsilon$=2.1).

0.2 part of $\Delta^{7:8}$-3$\beta$-acetoxy-11-keto-9$\beta$-cholestene are dissolved in 10 parts by volume of absolute ether, mixed with 2 parts by volume of a solution of 1 part by volume of concentrated sulfuric acid and 25 parts by volume of absolute ether, and maintained at room temperature in the dark for 6 hours. The reaction mixture is then diluted with ether, washed with sodium bicarbonate solution and water, and the ethereal solution dried and evaporated. The residue consists practically of pure $\Delta^{8:9}$-3$\beta$-acetoxy - 11 - keto - cholestene. After recrystallization from methanol the substance melts at 104–106° C.; [$\alpha$]$_D$=+125° C. (in chloroform). It has a strong absorption maximum at 252 m$\mu$ (log $\epsilon$=3.92).

*Example 7*

0.20 part by weight of $\Delta^{7:8:22:23}$-3$\beta$-acetoxy-11-keto-9$\beta$-ergostadiene is dissolved in 5 parts by volume of absolute benzene and the solution mixed with 0.06 part by volume of distilled boron trifluoride-ether-complex and the whole maintained for 40 hours at room temperature with the exclusion of moisture. The brown solution is then diluted with 50 parts by volume of ether, washed with sodium bicarbonate solution and with water, dried and evaporated. 0.20 part by weight of a semi-solid residue is obtained. After recrystallization from methanol, crystals of melting point 108–113° C. are isolated in good yield, which, on the basis of the ultraviolet spectrum, contain about 60 percent of $\Delta^{8:9:22:23}$-3$\beta$-acetoxy-11-keto-ergostadiene.

*Example 8*

0.100 part by weight of $\Delta^{7:8:22:23}$-3$\beta$-acetoxy-11-keto-9$\beta$-ergostadiene is dissolved in 5 parts by volume of chloroform, the solution mixed with 5 parts by volume of chloroform which has been saturated at –10° C. with hydrochloric acid and the whole kept for 2 hours at 25° C. The colorless reaction solution is then poured into sodium bicarbonate solution, diluted with ether and, after separation of the aqueous layer washed with water, dried and evaporated. The faint yellow, semi-solid residue obtained is recrystallized from methanol, whereby crystals of melting point 104–107° C. are obtained in good yield which, on the basis of the ultraviolet spectrum, contain 61 percent of $\Delta^{8:9:22:23}$-3$\beta$-acetoxy-11-keto-ergostadiene.

*Example 9*

1 part by weight of zinc dust is added to a suspension of 0.5 part by weight of $\Delta^{7:8:22:23}$-3$\beta$-acetoxy-11-keto-9$\beta$-ergostadiene in 20 parts by volume of glacial acetic acid and the mixture boiled for 2 hours under reflux. After the lapse of half the reaction time another 0.5 part by weight of zinc dust is added. The solution is then cooled to room temperature, decanted from undissolved zinc and diluted with ether. The ethereal solution is washed with water, sodium bicarbonate solution and water, dried and evaporated. A crystalline residue is obtained which according to the ultraviolet absorption contains 76 percent of $\alpha:\beta$-unsaturated ketone (log $\epsilon$=3.83 at 255 m$\mu$). After separation of a small amount of a high melting, less soluble by-product the pure $\Delta^{8:9:22:23}$-3$\beta$-acetoxy-11-keto-ergostadiene of melting point 131–131.5° C. is obtained by crystallization from ethanol.

*Example 10*

0.5 part by weight of $\Delta^{7:8:22:23}$-3$\beta$-acetoxy-11-keto-9$\beta$-ergostadiene in 20 parts by volume of acetic acid are kept at 100° C. for 3 hours. The resulting bright yellow solution is cooled, poured into 100 parts by volume of water and the yellow solid precipitate is filtered off by suction and dried over calcium chloride in vacuo. The crude product contains, according to the ultraviolet absorption, about 70 percent of $\Delta^{8:9:22:23}$-3$\beta$-acetoxy-11-keto-ergostadiene (log $\epsilon$=3.79 at 255 m$\mu$).

In an analogous way the reaction may be carried out in the presence of zinc acetate. A crude product is obtained which is in every respect identical with the product described above.

What we claim is:
1. $\Delta^{7:8}$-3$\beta$-acetoxy-11-keto-9$\beta$-cholestene.
2. $\Delta^{7:8}$-3$\beta$:17$\beta$-diacetoxy-11-keto-9$\beta$-androstene.

References Cited in the file of this patent

UNITED STATES PATENTS

| | | |
|---|---|---|
| 2,606,913 | Levin | Aug. 12, 1952 |
| 2,655,500 | Levin | Oct. 13, 1953 |
| 2,798,082 | Chemerda et al. | July 2, 1957 |
| 2,837,514 | Chamberlin | June 3, 1958 |
| 2,897,213 | Jones et al. | July 28, 1959 |

OTHER REFERENCES

Heymann: J. Amer. Chem. Soc., vol. 73, pp. 5252–5265, November 1951.

Heuser: Helvetica Chemica Acta, pp. 2106–2132, vol. 34, August 1951.